United States Patent

Rindby et al.

[11] Patent Number: 5,882,369
[45] Date of Patent: Mar. 16, 1999

[54] METHOD FOR PRODUCING A CAPILLARY INSIDE A MOLDABLE MATERIAL

[75] Inventors: Anders Rindby, Goteborg; Bengt Stocklassa, Linkoping; Sture Larsson, Goteborg, all of Sweden; Per Engström, Grenoble, France

[73] Assignee: X-Ray Capillary Optics I Goteborg AB, Goteborg, Sweden

[21] Appl. No.: 702,721

[22] PCT Filed: Mar. 3, 1995

[86] PCT No.: PCT/SE95/00227

§ 371 Date: Nov. 4, 1996

§ 102(e) Date: Nov. 4, 1996

[87] PCT Pub. No.: WO95/23770

PCT Pub. Date: Sep. 8, 1995

[30] Foreign Application Priority Data

Mar. 3, 1994 [SE] Sweden .................................. 9400729

[51] Int. Cl.⁶ .............................. C03B 23/04; B29C 55/00
[52] U.S. Cl. .............................. 65/64; 65/108; 65/DIG. 8; 264/291; 72/368; 72/370.25
[58] Field of Search .................................. 65/63, 64, 108, 65/86, 87, 88, 393, 439, 435, DIG. 8, DIG. 9; 264/563, 231, 291; 378/138; 428/34.4; 359/349, 641; 72/367.1, 368, 370.25, 377, 378

[56] References Cited

U.S. PATENT DOCUMENTS

| 3,183,721 | 5/1965 | Kaynan ...................................... 65/108 |
| 4,726,829 | 2/1988 | Gac et al. . |
| 4,848,998 | 7/1989 | Snitzer et al. . |
| 4,917,718 | 4/1990 | Berkey ...................................... 65/108 |
| 5,001,737 | 3/1991 | Lewis et al. ............................. 378/147 |

FOREIGN PATENT DOCUMENTS

| 1435541 | 3/1966 | France . |
| 2259064 | 1/1974 | France ..................................... 65/108 |
| WO 8203070 | 9/1982 | WIPO . |

*Primary Examiner*—Steven P. Griffin
*Attorney, Agent, or Firm*—Rhodes, Coats & Bennett, L.L.P.

[57] ABSTRACT

A method for producing at least one capillary in a moldable material. The capillary has a large length in relation to its cross-section. A closed cavity is created within the moldable material and the material is stretched in at least one direction so that the cavity forms a substantially elliptical or parabolic capillary whose length is large in relationship to its cross-section. The material may be heated before stretching so that the cavity is expanded and shaped into an essentially spherical form. Suitable materials for the practice of the invention include glass, plastic, quartz, silicon, or metal.

4 Claims, 2 Drawing Sheets

METHOD FOR PRODUCING A CAPILLARY INSIDE A MOLDABLE MATERIAL

FIELD OF THE INVENTION

The present invention refers to capillary tubes and methods for producing at least one capillary inside a workpiece of a mouldable material, such as glass, plastic, quartz, silicon, metal or the like, and which capillary has a big length in relationship to its cross section, comprising the steps of creating or producing a closed cavity within the workpiece, and stretching the material in at least one direction so much that the cavity forms a substantially elliptical or parabolic capillary having said length to width relationship.

BACKGROUND OF THE INVENTION

Capillary tubes whose inner surface has total reflecting properties with regard to electromagnetic radiation and whose longitudinal section is substantially elliptical/part elliptical or parabolic/part parabolic, can be used for focusing and or concentration of X-ray radiation beams, so that these are concentrated to a small area with high intensity.

However, a very high surface quality is required on the inside of the capillary tube, to enable for the X-ray radiation beam to pass by means of reflection from one opening at one end of the ellipsoid to an opening at the opposite end of the ellipsoid. It has also been shown that there should be a relationship in the magnitude of 1:1000 between both axes of the ellipsoid, to achieve an advantageous focusing of the X-ray radiation beam.

TECHNICAL PROBLEM

One purpose with the present invention is therefore to provide a production method for capillary tubes for this purpose.

SUMMARY OF THE INVENTION

For this purpose, the method according to invention is characterized in the additional step of heating the workpiece before stretching, so much at least right in front of the cavity that the cavity is expanded and shaped into an essentially spherical form.

The apparatus for focusing X-ray radiation and the like by means of a beam concentrator one end of which is connected to a source of radiation, is characterized in that the beam concentrator consists of at least one, in a workpiece of a mouldable material, such as glass, plastic, quartz, silicon, metal or the like, arranged capillary having a very small cross section in relationship to its length, that the capillary is formed by at least one cavity within the workpiece, by means of a closed or semiclosed cavity, that the workpiece with the included cavity is shaped by stretching in one direction under transformation of the cavity into said capillary, with a decreasing cross section at least in one of its ends, preferably with part elliptic or part parabolic shape as seen in the longitudinal direction of the capillary, and that one or both pointed ends of the capillary is cut off to form a passage/passages for the beam.

DESCRIPTION OF DRAWINGS

The invention will be described here below with reference to embodiments which are shown in the enclosed drawings, in which FIGS. 1 and 2 schematically discloses a first variant for providing a workpiece for producing capillary tubes according to the invention, FIG. 3 discloses a second variant for producing a workpiece for production of capillary tubes according to the invention, and FIGS. 4 and 5 discloses such a workpiece, respectively before and after extension to a capillary tube.

DESCRIPTION OF EMBODIMENTS

Figure 1:
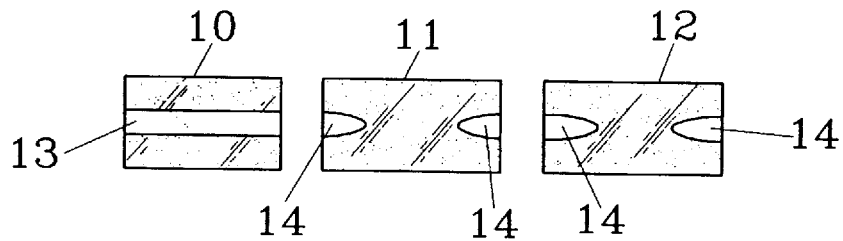

FIG. 1 discloses three cylindric glass bodies 10, 11 and 12, of which the left constitutes of a glass tube with a longitudinal hole 13. The other two glass bodies 11, 12 are provided with in each of its ends made depressions 14. By heating, it is possible to melt together the ends of the three glass bodies, resulting in the fused glass body 15 shown in FIG. 2, which includes a blind tube channel 16 with arbitrary length, an ellipsoid cavity 17 and a depression 14. The hole 13 and the depressions 14 can for example be provided by casting the bodies 10–12 in mould.

Figure 2:
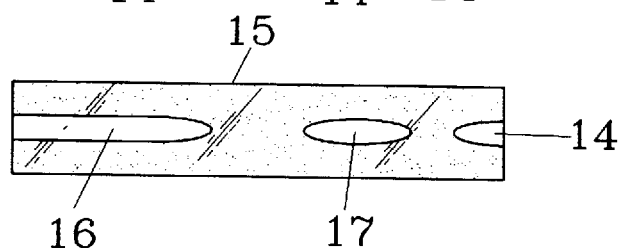

Consequently, FIGS. 1 and 2 discloses a possible method to provide gas bubbles in a glass body. By heating the glass body 15, the tube channel 16 can be made to collapse at suitable places, so that a series of cavities are formed.

It is also possible to heat the material nearby a cavity to the appropriate temperature for workability, whereby the cavity automatically strives to form a sphere. This is due to the fact that the heated gas in the cavity exerts a pressure upon the surrounding melted glass, which thereby is shaped until the cavity takes the shape of a perfect sphere.

Even if the tube channel 16 or the enclosed cavity 17 consequently to begin with, can be produced without consideration to surface finish, the surface finish can be obtained through appropriate heating of the glass material.

Figure 3:
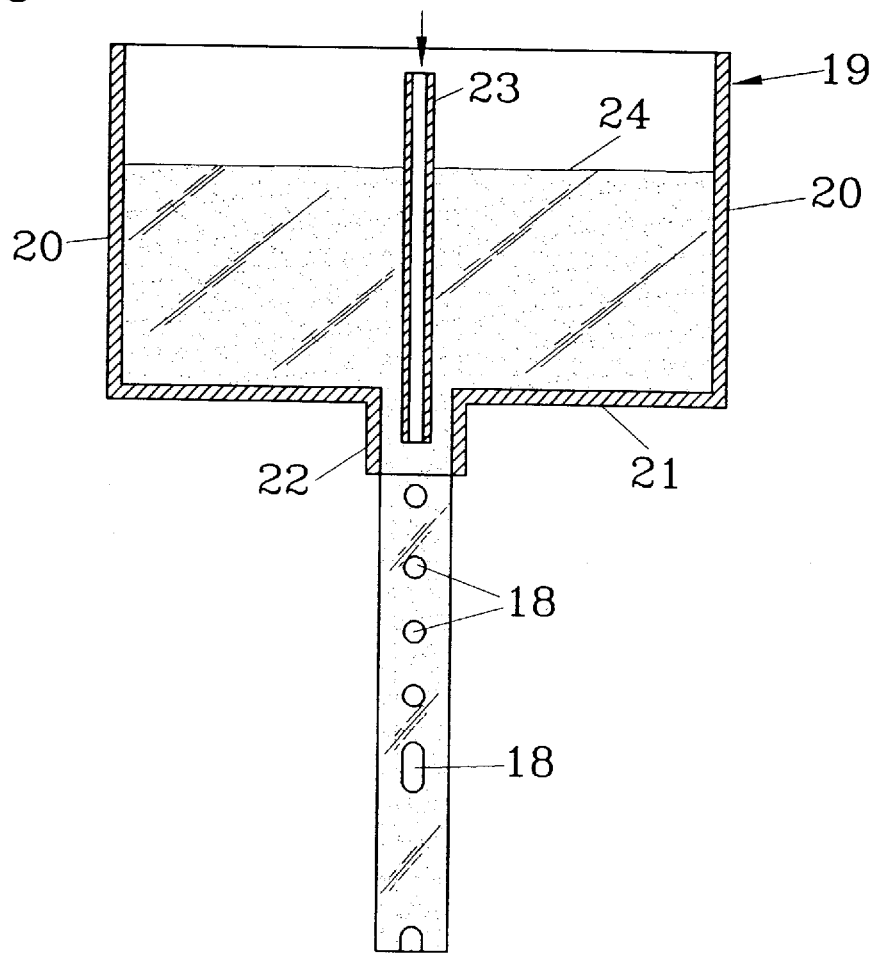

FIG. 3 discloses an alternative method for producing an oblong, for example, cylindric glass body with gas bubbles 18. For this purpose, a container 19 is equipped with side-walls 20 and a bottom wall 21 with an outlet opening 22 in the bottom wall. A narrow injector pipe 23 protrudes downwards into the outlet opening 22 and is connected to a not shown source of pressurized gas. A glass melt 24 is heated to the appropriate temperature in the container 19, is allowed to flow, be extruded under pressure or is drawn out via the outlet opening 22, while uniform gas bubbles are formed by frequent injection of an amount of gas in the outfeeding mass via the injector tube 23.

Figure 4:
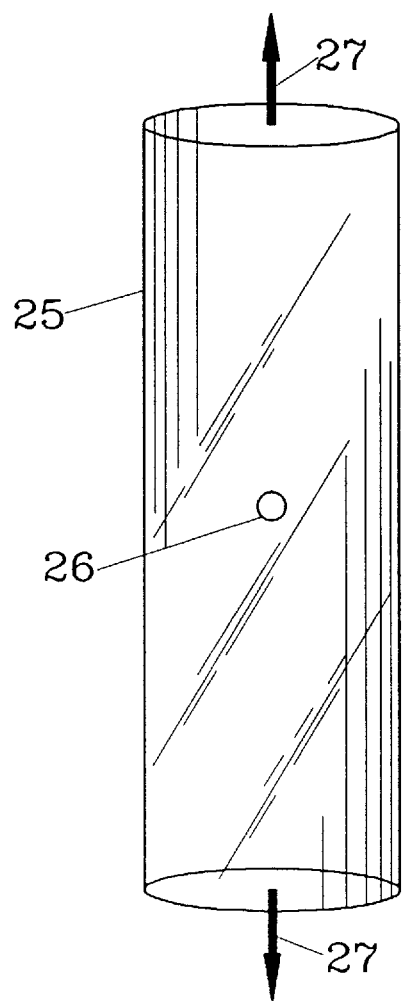
Figure 5:
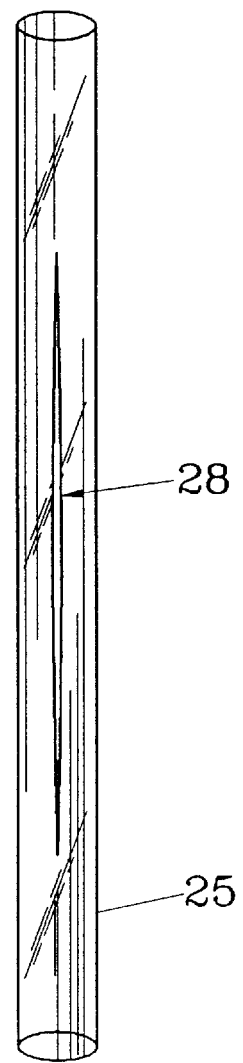

The received string of gas bubbles can either be cut into small sections, each containing a gas bubble, which small sections afterwards can be worked further according to FIGS. 4 and 5, or the string can be worked further directly by stretching. For this purpose, rollers or other means of pulling can be placed in the extension of the string.

FIG. 4 discloses a glass rod 25 with a spherical gas bubble 26. The arrows 27 symbolizes pulling forces which are applied to the heated rod. After stretching according to FIG. 5, to a length which is several times the original length of the glass rod, a narrow glass rod with a symmetrical ellipsoid shaped inner cavity 28 is obtained. By applying a sufficiently large force, such conditions can be achieved, that the geometrical relations between the diameter of the cavity and the diameter of the glass rod is maintained exactly, for each cross section through the glass rod, during the very stretching process. Consequently, the spherical cavity can be drawn out along the longitudinal direction of the glass rod, while its other geometrical characteristics are maintained.

The stretching can be performed according to different methods, e.g. by means of utilizing the dead weight of the rod during the draw, possibly in combination with heating.

The rod may also be given a higher temperature within the area of stretching, to obtain more workability within this very part of the rod. The stretching can be performed in different medias and can also be complemented with means for speeding up the stretching process, e.g. weight or spring. Alternatively rod may be placed in a medium with a higher density than the rod, whereby stretching will occur in a direction which is contrary to the direction of gravity.

In above description, the expression "glass" has been used to indicate a material which by heating can assume both the solid and the plastic state. As examples of possible materials can be mentioned:

Glass of different qualities, e.g. lead glass or boron silicate that can be worked up to 1200° C. Thermoplastic materials, e.g. polyethylene, can be worked up to 600° C. Thermosetting plastic, e.g. epoxide resin plastic, can be worked up to 700° C. Composite materials, e.g. carbon fibre polyester, can be worked up to 700° C. Quartz can be worked up to 1500° C. Silicon can be worked up to 1500° C. Metal, e.g. gold, lead, tin, or copper, or metal alloys, e.g. brass, which can be worked up to 2000° C.

Heating can be performed by means of for example a gas jet or other organic source of energy, electric direct heating, supply of energy via electromagnetic radiation from electric radiation source as well as a laser beam. These sources can be used alone or in combination. The workpiece can be heated right in front of the cavity prior to stretching.

The working of the material can be performed by drilling, milling, grinding, etching, laser cutting or shaping under pressure or vacuum, or combinations of these.

The time for the stretching process can vary from less than a second to up to several days depending upon the material.

The invention is not limited to the above described embodiments, but more variants are conceivable within the scope of the accompanying claims. For example, a glass body can be equipped with several cavities arranged in parallel, who can be stretched out into parallel capillaries according to the above described method. The capillary tubes can according to art be coated with metal, to increase density in the surface and thereby reflection. The capillary tube can be used for other purposes than for focusing and compression of other radiation than X-ray radiation, e.g. other wavelengths, or other types of particles such as electrons, neutrons or protons.

We claim:

1. A method for producing at least one capillary inside a workpiece of a moldable material, said capillary having a large length in relationship to its cross-section, the method comprising the steps of producing a closed cavity within the workpiece stretching the workpiece in at least one direction such that the cavity forms a substantially elliptical or parabolic capillary having said length to cross-section relationship; and heating the workpiece before stretching, such that the cavity is expanded and shaped into an essentially spherical form.

2. The method according to claim 1 wherein the step of producing the closed cavity is accomplished by introducing at least one gas bubble in a fluid mass of moldable material.

3. The method according to claim 1 wherein the step of heating comprises applying heat directly to the cavity.

4. The method according to claims 1 or 2, wherein the moldable material is selected from the group consisting of glass, plastic, quartz, silicon and metal.

\* \* \* \* \*